Figure 1:
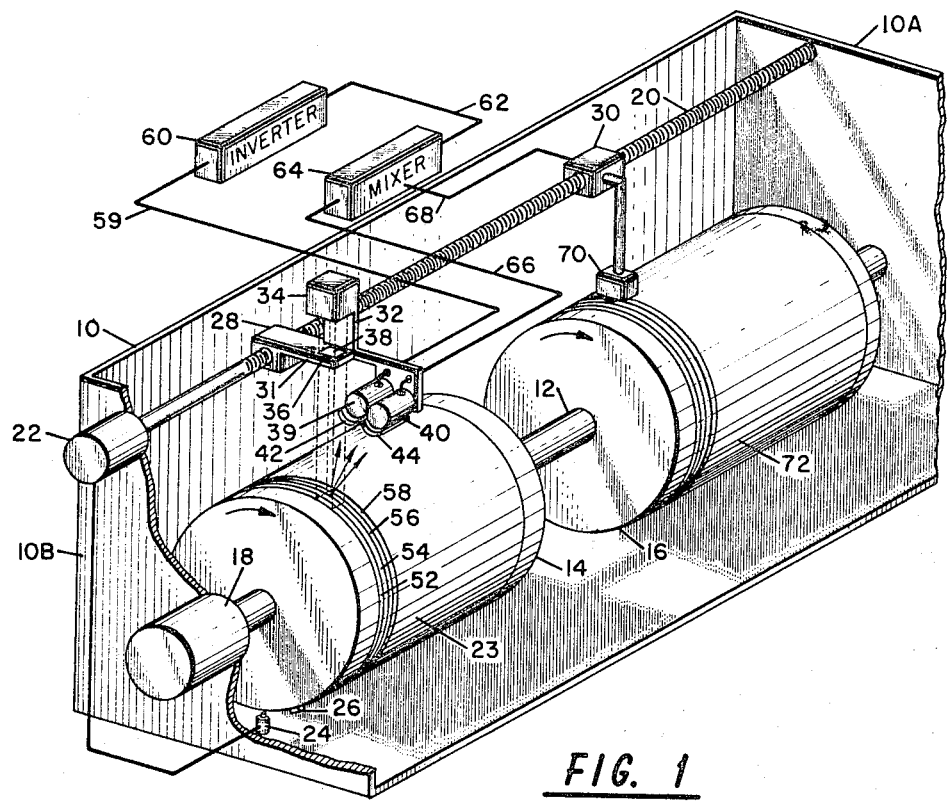

May 30, 1967

E. K. SHAW ETAL 3,323,103

OPTICAL CONVOLUTION OF A FIRST FUNCTION BY A SECOND FUNCTION
HAVING A UNIT IMPULSE RESPONSE

Filed Sept. 21, 1964

Ernest K. Shaw
John E. Hogg
INVENTORS.

BY John D. Gassett
ATTORNEY 3,323,103
OPTICAL CONVOLUTION OF A FIRST FUNCTION BY A SECOND FUNCTION HAVING A UNIT IMPULSE RESPONSE
Ernest K. Shaw and John E. Hogg, Calgary, Alberta, Canada, assignors, by mesne assignments, to Esso Production Research Company, Houston, Tex., a corporation of Delaware
Filed Sept. 21, 1964, Ser. No. 397,867
8 Claims. (Cl. 340—15.5)

This invention relates to the art of filtering. It relates especially to electro-optical filtering. It is more especially concerned with electro-optical filtering of seismic signals.

The method commonly employed for searching for petroleum or other mineral deposits is that known as seismic prospecting wherein a seismic disturbance is initiated at a selected point in or near the earth's surface to direct seismic waves downwardly into the earth at that point. The waves continue to travel downwardly within the earth until they encounter discontinuities in the earth structure and composition in the form of various substrate formations and the like. These discontinuities have the effect of reflecting a portion of the seismic waves back toward the surface of the earth. Sensitive pickups, sometimes called seismic detectors, seismometers, transducers, or geophones, are arranged at a plurality of points along the earth to translate the detected earth motion to electrical impulses which, after suitable amplification, are recorded. The signal recorded then is usually indicative of the character of the ground motion and of the position of the reflecting beds and are usually referred to collectively as a seismic signal, which is in effect a composite signal made up of a plurality of electrical signals varying in frequency and amplitude. The electrical signals oscillate about a no signal zero voltage or detected and recorded are then processed and displayed in various ways.

Furthermore, by using accurate timing devices and recording means, it is possible to determine, not only the magnitude of the signal received by the various geophones, but also to measure the time required for the seismic waves to travel from the disturbance points down to the various discontinuities and then to the geophones.

In the past it has been the general practice to amplify the seismic signal generated by the geophone and record the signal by means of a suitable camera. The recording means may take the form of a recording oscillograph, or as more recently the case, usually take the form of a magnetic photographic recording device capable of recording a signal in reproducible form. It is this amplified record signal with which the seismic computers or interpreters study.

Most conventional seismographs (that is, devices for recording seismic signals) are capable of recording up to twenty-four or more seismic signals simultaneously. Thus, if a seismic observation results in twenty-four seismic signals being generated at as many detection stations, the resulting seismogram is a twenty-four trace record of the resulting twenty-four signals. The traces are usually arranged in a side-by-side manner to simulate a reasonable cross-section of the earth under study. Timing marks, indicating predetermined time intervals are simultaneously recorded with the seismic signals to indicate the amount of time along each trace.

In this description it is assumed that the term "seismic trace or channel" is intended to mean the record formed on a recording medium by the reception of a train of signals from an individual geophone location. The term "seismogram" is intended to mean a multiple trace recording of a plurality of geophone signals from a seismic observation. The term "seismic section" shall be intended to mean a seismogram prepared from one or more seismograms. The individual traces that form the seismic section are arranged in the same manner or order as the geophone locations corresponding to the traces; and the distance between the centers of variable density traces are preferably proportional to the distance between the geophone locations so as to render the final production a reasonably accurate map or vertical cross-section of the portion of the earth under study.

The recorded reflections in the individual traces which make up the seismic section are usually spaced so closely together that the reflection patterns from a number of vertically spaced underground discontinuities are superimposed to the extent that they are sometimes nearly hidden in the composite seismic signals originally recorded. Such a complex signal is most difficult to interpret. Therefore, various procedures have been tried and used with some success to improve the usefulness of the seismic signals which have been recorded. Some of the procedures which have been tried include filters, different ways of arranging the individual geophones within an array of geophones, etc. These techniques have greatly improved the usefulness of data obtained from seismic records. One of the most useful of these procedures is the use of filters which ordinarily are of the electronic variety. These electronic filters are useful in correlating one signal or function with another function. The usefulness of such electronic filters is usually at least partially offset by the high cost of processing the individual functions into the filter.

Another filtering technique can be called an optical filtering technique in which, for example, a first filter function is displayed as a variable density time function and is used for producing a filtering action on a second function, which is also displayed in variable density form. Such a system is described in U.S. Patent 3,204,248. By variable density it is normally meant that the display of a signal, such as a seismic signal, is such that the intensity of the display is a function of the amplitude of the seismic signal. The signal is usually displayed as a straight channel of uniform width.

In conventional optical filtering there is the restriction that only those functions that have no negative values can be handled. To filter optically with impulse responses that contain negative values it is necessary to add a bias to the impulse response in order to make it positive everywhere. This added bias inevitably distorts the desired filter characteristic. It is therefore desirable to provide a filter system whereby this objectionable feature is eliminated. The present invention provides such a system. It is an object of the present invention to provide a system for electro-optically filtering a two dimensional input signal in variable density form without the need of adding a bias to the filter's unit impulse response.

Figure 2:
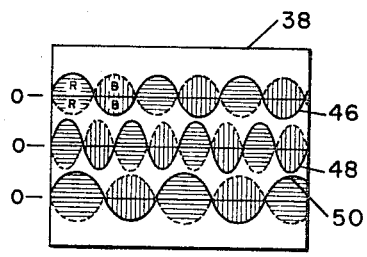

Other objects and an understanding of the invention can be had from the following discussion taken in conjunction with the drawing in which:

FIG. 1 represents an apparatus upon which the electro-optical filtering of this invention can be conducted, and FIG. 2 illustrates a filter function section.

Attention is now directed to the drawing, and in FIG. 1 in particular, where there is shown a frame 10 upon which is mounted a shaft 12 in end members 10A and 10B. Mounted on shaft 12 is a section drum 14 and a recording drum 16 which rotate in unison. Shaft 12 and drums 14 and 16 are driven or rotated by electric motor 18.

Mounted on drum 14 is a variable density seismic section 23. Section 23 is an opaque print whose reflectivity is a function of the section or trace. Variable density normally means the display of a signal in a manner such that the intensity of the display is a function of the amplitude of the seismic signal. The seismic section is made up of a plurality of such seismic signals thus displayed in variable density form and arranged side by side. The intensity of light reflected from the section is proportionate to the particular part of the seismic section toward which the light is directed.

Mounted within frame 10 and parallel to shaft 12 is a threaded shaft 20 driven by motor 22. Motor 22 is a step-type motor or stepping device which, upon receiving a signal, advances or rotates a preselected amount.

Mounted on shaft 20 is a first traveling block 28 and a second traveling block 30. These blocks have a threaded passageway through which the threaded shaft 20 is threaded or screwed. The back side of blocks 28 and 30 have sliding contact with the frame 10 to resist rotation so that rotation of threaded shaft 20 causes the blocks to move laterally in unison. Mounted from traveling block 28 is a base frame 31 which has an upright member 32. Upright member 32 supports collimated light source 34. Also mounted from frame 31 is a transparent opening 36 upon which is mounted or placed the selected filter function section 38 as shown more clearly in FIG. 2, for example.

Motor 22 is actuated by the contact switch 24 and cam 26. When cam 26 contacts switch 24, a signal is given for step-type transmission of motor 22 to advance a preselected amount. This provides lateral shifting of filter function section 38 after each revolution of section drum 14.

Light source 34 is arranged to direct collimated light through section 38 which is placed on transparent opening 36 onto the surface of drum 14. The light source, input section on drum 23 and photomultiplier tubes are arranged so that only scattered light (not directly reflected light) will be picked up by the photomultipliers. This is to avoid glare from the glossy surface of some prints which is not related to the VDF signal on the prints. The light which is scattered or reflected from section 23 is picked up by two photomultiplier tubes 39 and 40. In front of tube 39 is a blue filter 42 which passes only blue light; and in front of tube 40 is a red filter 44 which passes only red light. These filters can be transparent gelatin filters. The purpose of the red and blue filters will be apparent from the ensuing description.

Attention is now directed toward the filter function section 38 shown in FIG. 2. Shown thereon are three traces 46, 48, and 50. The traces 46, 48, and 50 represent a filter function. To illustrate, traces 46, 48, and 50 are derived from a two-dimensional impulse response (which is function of 2 variables $x$ and $y$, for example) simply by digitizing it in one direction into traces. As will be shown, the function section 38 can be considered a two-dimensional unit impulse response of the filter through which it is desired to process the seismic section. These traces, 46, 48, and 50, are in variable area form. Each trace oscillates about a zero reference line and thus contains positive amplitudes and negative amplitudes. The solid line represents the trace and the dotted line represents the equivalent value of opposite polarity. The positive amplitudes of the solid line are represented by a transparent red film on both sides of the base line between the solid line and the dotted line, and the negative amplitudes are represented by transparent blue film also on both sides of the base line. The balance of section 38 is opaque. The two colors used need not be primary colors but should not contain any wavelengths in common. The traces representing the filter function section 38 can also be in variable density form and would use two colors with one being in variable intensity according to the positive amplitude and another color according to the negative amplitudes. Either the section 23 or the filter function 38 or both should be in variable density form.

Section 38 representing the filter function is placed on transparent opening 36 of traveling block 28. The spatial relationship of the traces of the filter function section 38 and the seismic section 22 in one embodiment is that collimated light from light source 34 is directed through trace 50 onto the first trace 52 of the seismic section. Light is also directed through traces 48 and 46 respectively onto traces 54 and 56 of the section.

The output of photomultiplier 39 is an electrical signal which is connected through conductor 59 to an inverter 60. This inverter inverts the electrical signal and transmits it through conductor 62 to a mixer or adder 64. The output from photomultiplier tube 40 is conducted through conductor 66 to adder 64 where the signal is added to the output of the inverter 60. The output of adder 64 is conducted through line 68 to a magnetic recording head 70 which is carried by traveling block 30. Magnetic head 70 is arranged adjacent a magnetic recording tape 72 which is mounted on drum 12.

Attention will next be directed toward the operation of the device of FIG. 1 for obtaining a two-dimensional convolution of the input (seismic section 23) with the unit impulse response (illustrated in FIG. 2) of the filter. By "unit impulse response" it is meant the output of the system when the input is a unit spike, that is, a very short, sharp signal. The seismic section can be thought of as a two-dimensional signal. The variable density section 23 can be thought of as a plot of amplitude vs. distance in one direction (the $y$ direction) and amplitude vs. distance in another direction (the $x$ direction). This can be thought of as a two-dimensional signal which can be called $g(x, y)$. This can also be called the input. Just as the expression $g(x, y)$ is a mathematical representation of the input, $h(x, y)$ is a mathematical representation of the unit impulse response of the filter.

The filter function of FIG. 2 is placed on the transparent holder 36. Trace 46 of section 38 is aligned with trace 52 of seismic section 23. The magnetic tape is placed on drum 16. Motor 18 is started and as it rotates, a real image of the impulse response $h(x, y)$ is projected onto the input $g(x, y)$ of the seismic section which is rotated by the drum 14. The reflected blue and red light is picked up by photomultiplier tubes 39 and 40 respectively. The output of photomultiplier 39 is a product of the blue light of the impulse response and that part of the input upon which the image of the blue light falls. The output of photomultiplier tube 39 is likewise a product of the negative portion (blue light) of the impulse response and that part of the input or seismic section upon which the image falls. The photomultiplier tube 40 has a similar relationship to the red light. The reflected red light is picked up by photomultiplier tube 40 which is behind the red gelatin filter 44. The output of photomultiplier tube 40 is then representative to the product of the positive portion (red) of the impulse response and that part of the input of the seismic section upon which the image falls.

The output of photomultiplier tube 39 which is responsive to the blue light is inverted by inverter 60 and added to the output of photomultiplier tube 40 which is responsive to the red light. The output of adder 64 is then recorded on magnetic tape 72. For each instantaneous position of the drum with respect to the filter the total amount of light picked up by the photomultiplier tubes is proportional to the integrals of the product of the image of the seismic section contacted and the blue light and that of the image and the red light. By moving the seismic section, the integrals become convolution integrals.

When drum 14 has made one revolution, cam 26 contacts switch 24 which signals motor 22 to shift traveling blocks 28 and 30 a distance laterally, which is equal to the width of the trace on the variable density section 23. Cam 26 is arranged to contact switch 24 at the end of each revolution after the traces 52, 54, and 56 have been completely processed. Then, on the first lateral shifting of the traveling blocks, traces 46, 48 and 50 are aligned respectively with traces 54, 56, and 58. This lateral shifting is continued after each revolution until trace 50 of the filter function is aligned with the last trace (to the right) on the variable density section. For each revolution, the output of mixer 64 is recorded. In other words, the output from each revolution of the drum is one trace of the two-dimensional output.

Broadly speaking to briefly summarize one preferred form of the invention is a system for electro-optically filtering a two-dimensional input signal in variable density form in two dimensions without the need of adding a bias to the filter's unit impulse response. The unit impulse response of the desired filter function is digitized into a series of parallel side-by-side traces. The traces representing the function are in variable area form with the positive amplitude represented by one transparent film of one color, such as red, and the negative amplitudes are represented by a second transparent film of a second color, such as blue. A real image of this impulse response, as depicted by the red and blue transparent film, is projected onto the input function such as a seismic section which is recorded in variable density form. The input or seismic section is moved with respect to the real image so that the entire input is contacted by the real image of the impulse response. The reflected light of the two colors is a product of the positive and negative portion of the impulse response and that part of the input on which the image falls. The reflected light is picked up by two photomultiplier tubes; one is behind the filter for one of the colors and the other is behind the filter for the other color. The output of the photomultiplier tube behind the filter representing the negative portion is electronically inverted and added to the output of the other photomultiplier tube. The added output forms the output as an electrical signal. By continually moving the real image of the impulse response with the section, a convolution of the input with the unit input response is accomplished. The real image of the filter function is shifted laterally as required with respect to the seismic section so that the entire section is filtered.

This two-dimensional convolution can be expressed mathematically.

Let $g(x, y)$ be the input and let $h(x, y)$ be the unit impulse response of the filter.

If mathematicians wish to say that they are convolving the function $g(x, y)$ with the function $h(x, y)$ they write the following relationship:

$$g(x, y) * h(x, y)$$

Mathematically this can be summarized as $$\iint g(x^1, y^1) h(x-x^1, y-y^1) dx^1 dy^1$$

The following mathematical analysis shows that convolution with a function which has both positive and negative values is identical with a convolution with the positive portions of the function minus the convolution with the rectified negative portions of the function. In this regard let $g(x, y)$ be the input.
Let $h(x, y)$ be the unit impulse response of the filter.
Let $h_+(x, y)$ be the positive portion of the unit impulse response.
Let $-h_-(x, y)$ be the negative portion of the unit impulse response.
Then $h_+(x, y) - h_-(x, y) = h(x, y)$.
The convolution of $g(x, y)$ with $h(x, y)$ is $$\iint g(x^1, y^1) h(x-x^1, y-y^1) dx^1 dy^1$$
$$= \iint g(x^1, y^1)(h_+(x-x^1, y-y^1) - h_-(x-x^1, y-y^1)) dx^1 dy^1$$
$$= \iint g(x^1, y^1)(h_+(x-x^1, y-y^1)) dx^1 dy^1$$
$$- \iint g(x^1, y^1) h_-(x-x^1, y-y^1) dx^1 dy^1$$

Without benefit of this invention it is necessary in the optical filtering of two-dimensional variable density inputs to either (a) use only those unit impulse responses which are everywhere positive or (b) to add a bias to the desired impulse response in order to make it positive everywhere. Condition (a) is extremely restrictive and condition (b) means that the Fourier transform of the bias is added to the desired frequency characteristic of the filter thus seriously distorting it. With the present invention, complete flexibility in the choice of optical filtering characteristics is attained without these disadvantages, (a) and (b).

It was shown above that the two dimensional convolution with a function which has both positive and negative values is identical to the convolution with the positive portion of the function minus the convolution with the rectified negative portion of the function. This also applies to one dimensional filtering and, therefore, one dimensional filtering can be performed with this operation by using only one trace 48 of the impulse response 38. This mathematical analysis shows this in which:

Let $g(x)$ be the input.
Let $h(x)$ be the unit impulse response of the filter.
Let $h_+(x)$ be the positive portion of the unit impulse response.
Let $-h_-(x)$ be the negative portion of the unit impulse response.
Then $h_+(x) - h_-(x) = h(x)$.

The convolution of $g(x)$ with $h(x)$ is $$\int g(x^1) h(x-x^1) dx^1$$
$$= \int g(x^1)(h_+(x-x^1) - h_-(x-x^1)) dx^1$$
$$= \int g(x^1) h_+(x-x^1) dx^1 - \int g(x^1) h_-(x-x^1) dx^1.$$

It will be apparent to persons skilled in the art that many modifications of this invention are possible without departing from the spirit or scope thereof. Therefore, it is intended that the invention not be limited to the specific examples presented. It is therefore desired that only such limitations be imposed on the appended claims as are stated therein.

What is claimed is:

1. An apparatus for electro-optically filtering a first function by a second function which comprises:
   a frame member;
   a first shaft supported from said frame member;
   a second shaft supported from said member parallel to said first shaft, said second shaft being threaded;
   a section drum mounted on said first shaft;
   a recording drum mounted on said first shaft longitudinally from said section drum;
   means to rotate said first shaft;
   a first traveling block and a second traveling block threadedly mounted on said second shaft;
   means to rotate said shaft a selected amount upon each revolution of said first shaft;
   light means supported from said first traveling block for directing collimated light onto said section drum;
   a first photomultiplier tube and a second photomultiplier tube supported from said first traveling block and arranged to receive collimated light reflected from said section drum, the electrical output of each tube being a function of the amount of light striking such tube;
   a first optical filter of a first color between said first tube and said section drum and a second transparent optical filter of a different color between said second tube and said section drum;
   means for inverting the output of said first tube;
   means for adding the output from said inverter means to the output of said second tube;
   a magnetic head supported by said second traveling block; and
   means connecting said magnetic recording head to the output of said adding means.

2. An apparatus for filtering a first function represented by a visual display by a second function having an impulse response represented by a visual display which comprises:
   a collimated light source;
   means for moving said first function with respect to said light source;

support means positioned between said collimated light source and said means for holding said impulse response;

a first photomultiplier tube arranged to receive collimated light scattered from said first function;

a second photomultiplier tube arranged to receive collimated light scattered from said second function;

a transparent filter of one color spaced between said first tube and said first function;

a second transparent filter of a second color placed between said photomultiplier tube and said first function;

an inverter electrically connected to the output of said first tube;

an adder;

means connecting the output of said inverter to said adder; and means connecting the output of said second tube to said adder.

3. An apparatus as defined in claim 2 including means for recording the output of said adding means on magnetic recording tape.

4. A method of optically filtering a first function by a second function having an impulse response which comprises:

preparing the first function in variable density form;

preparing a variable area impulse response transparency of the second function by representing all positive amplitudes of the second function by a transparent film of one color and all negative amplitudes of the second function by a transparent film of another color;

directing collimated light through said variable area impulse response transparency toward said first function;

moving said first function with respect to said second function;

generating a first electrical signal indicative of the product of said first color of said impulse response transparency with that of said first function;

developing a second electrical signal indicative of the instantaneous product of said second color with respect to said first function;

inverting the first electrical signal and adding it to the second electrical signal; and recording the signals thus added.

5. A method of convolving a first function by a second function having a unit impulse response which comprises:

representing the positive amplitudes of said impulse response by a transparent film of one color and representing the negative amplitudes of said impulse response by a transparent film of a second color to obtain a color-sensitive filter section;

representing said first function by a variable density display;

moving said filter section by said first function while directing collimated light through said filter section onto said first function;

generating a first electrical signal indicative of the instantaneous product of said first color of said filter function with said first function;

developing a second electrical signal indicative of the instantaneous product of said second color of said filter function with said first function; and inverting the first electrical signal and adding it to the second electrical signal.

6. A method of convolving a first function by a second function having a unit impulse response which comprises:

representing the positive amplitudes of said unit impulse response by light passing medium passing light of a first color and representing the negative amplitudes of said unit impulse response by a light passing medium which passes a light of a second color not contained in said first color to obtain a filter function display;

impressing an image upon a medium whose light reflectivity is a function of the first function to obtain a function section;

moving said function section by said display while directing collimated light through said display onto said function section;

generating a first electrical signal indicative of the instantaneous product of said first color of said function section with that of said display;

developing a second electrical signal indicative of the instantaneous product of said second color of said filter function with that of said function section;

inverting the first electrical signal; and adding the signal thus inverted to the second electrical signal.

7. An apparatus for filtering one function by a second function which comprises:

a collimated light source;

carrier means positioned from said light source;

means for moving said carrier means with respect to said light source;

support means for holding said collimated light source;

a first photomultiplier means supported by said support means;

a second photomultiplier means supported by said support means adjacent said first photomultiplier tube;

an optical filter of one color spaced between said first tube and said carrier means;

a second optical filter of a second color supported by said support means and supported between said second photomultiplier tube and said carrier means;

an inverter electrically connected to the output of said first tube;

an adder; and means connecting the output of said inverter to said adder and means connecting the output of said second tube to said adder.

8. A method of convolving a first function by a second function having a unit impulse response which comprises:

representing the positive amplitudes of said unit impulse response by a given quantity of light of one color and the negative amplitudes of a given quantity of light of another color not contained in said first color;

impressing said light of said first color and said light of said second color on a medium whose light reflectivity is a function of sail first function;

separately detecting the light of said first color reflected by said medium to produce a first detection signal, and the light of said second color reflected by said medium to produce a second detection signal; and inverting one detection signal and adding it to the second detection signal.

References Cited
UNITED STATES PATENTS

| | | | |
|---|---|---|---|
| 2,712,415 | 7/1955 | Piety | 343—100.7 |
| 2,839,149 | 6/1958 | Piety | 346—33 |
| 3,030,021 | 4/1962 | Ferre | 343—100.7 |
| 3,204,248 | 8/1965 | Alexander | 346—33 |
| 3,243,820 | 3/1966 | Alexander | 346—109 |

BENJAMIN A. BORCHELT, *Primary Examiner.*

R. M. SKOLNIK, *Assistant Examiner.*